United States Patent [19]

McCarter

[11] 4,374,171

[45] Feb. 15, 1983

[54] SMOLDER AND FLAME RESISTANT INSULATION MATERIALS, COMPOSITION AND METHOD

[75] Inventor: Robert J. McCarter, Gaithersburg, Md.

[73] Assignee: The United States of America as represented by the Secretary of Commerce, Washington, D.C.

[21] Appl. No.: 313,045

[22] Filed: Oct. 19, 1981

Related U.S. Application Data

[63] Continuation-in-part of Ser. No. 51,922, Jun. 25, 1979, abandoned, which is a continuation of Ser. No. 870,385, Jan. 18, 1978, abandoned.

[51] Int. Cl.³ .............................................. D04H 1/58
[52] U.S. Cl. ..................................... 428/288; 252/607; 427/412; 427/419.2; 428/289; 428/920; 428/921
[58] Field of Search ............... 428/288, 289, 920, 921, 428/411, 688, 702; 252/8.1; 427/412, 419.2

[56] References Cited

U.S. PATENT DOCUMENTS

| | | | |
|---|---|---|---|
| 2,867,549 | 1/1960 | Outterman | 428/921 |
| 3,027,326 | 3/1962 | Moffett | 428/921 |
| 3,576,590 | 4/1971 | Hirsch | 428/921 |
| 3,912,792 | 10/1975 | Touval | 428/921 |
| 4,012,507 | 3/1977 | Knoepfler | 428/921 |
| 4,038,451 | 7/1977 | Brown | 428/921 |
| 4,079,158 | 3/1978 | Kennepohl | 428/921 |
| 4,302,345 | 11/1981 | McCarter | 428/921 |

*Primary Examiner*—Marion McCamish
*Attorney, Agent, or Firm*—Eugene J. Pawlikowski; Alvin J. Englert

[57] ABSTRACT

A flame and smolder resistant cellulosic insulation material, method of treating loose-fill cellulosic material, and composition for imparting flame and smolder resistance to such materials are disclosed with the combination of from about 2 to 9% sulfur and from about 10 to 25% flame retardant uniformly distributed in the cellulosic insulation material based on the weight of cellulosic material.

35 Claims, No Drawings

SMOLDER AND FLAME RESISTANT INSULATION MATERIALS, COMPOSITION AND METHOD

This application is a continuation-in-part of my earlier filed pending application, Ser. No. 51,922, filed June 25, 1979, now abandoned, which is a continuation of my application Ser. No. 870,385, filed Jan. 18, 1978, now abandoned.

BACKGROUND OF THE INVENTION

1. Field of Invention

This application concerns the reduction of smoldering tendencies in cellulosic insulation materials, especially in shredded or "loose-fill" form. In particular, the invention relates to methods of treating cellulosic insulation materials with chemicals to render them both sufficiently flame resistant and smolder resistant as to comply with federal safety regulations for such materials.

2. Description of Prior Art

Cellulosic loose-fill insulation has been in use for many years and in recent times has supplied an expanded market for thermal insulation in residential and commercial buildings, and in retrofitting such structures. The chief advantages of loose-fill insulation material are the abundant availability at relatively low cost of raw material such as recycled newspapers and other fibrous cellulosics, the excellent insulating properties of the product, and the ability of the insulation to flow into and fill wall cavities. However, cellulosic loose-fill insulation in untreated form would pose an unacceptable flammability hazard to the structures utilizing such insulation. Accordingly, it is conventional in the loose-fill fiber insulation industry to treat the cellulosic material with combustion retardant compounds such as boric acid, borax, aluminum sulfate and the like prior to use. Representative patent literature in this area includes U.S. Pat. No. 3,027,326 to Moffett which discloses the treatment of insulation materials such as shredded newspaper fluff and shredded wood with a composition consisting of ammonium sulfate, boric acid and potassium alum to reduce the flame and smoldering tendencies of the insulation materials. Other references disclosing the use of phosphates, borates and sulfonates as fire retardants for cellulosic materials include U.S. Pat. No. 2,867,549 to Outterson, U.S. Pat. No. 4,012,507 to Knoepfler and U.S. Pat. No. 4,038,451 to Brown et al. Of all the compositions utilized as combustion retardants for insulation materials, boric acid presently appears to be the most universally used compound, as it is a uniquely effective retardant of smoldering combustion. However, periodic shortages of boric acid and the accompanying price increases of this chemical have been problems in its use and indicate the need for an economical substitute agent for suppressing smoldering.

Accumulating evidence that smoldering ignitions in cellulosic loose-fill insulation were the primary combustion hazard of the material resulted in federal regulations that included provisions to limit smoldering tendencies of the insulation (1978-General Services Administration Specification HH-I-515D, 1979-Consumer Product Safety Commission Interim Safety Standard for Cellulose Insulation). Thus, while the conventional borax, aluminum sulfate and other similar compositions have been widely used as adequate flame retardant compositions for loose-fill insulation materials, all are totally incapable of providing both flame retardancy and acceptable smolder retardant properties. In fact, many of the conventional flame retardant compositions are often used in such quantities and are of such a nature that they actually increase the smolder tendency of the loose-fill insulation material. This is not only true with the insulation industry, but has remained a problem for sometime in the plastics industry. Thus, many attempts have been made at formulating fire retardant compositions for polymeric materials which retard flaming tendencies and, at the same time, inhibit non-flaming combustion or glowing-type combustion as it is sometimes called. A particularly pertinent example of one such attempt is U.S. Pat. No. 3,912,792 to Touval.

SUMMARY OF THE INVENTION

It is, therefore, a primary objective of the present invention to provide flame retardancy and smoldering inhibition to loose-fill cellulosic materials by means of a highly simple and economical combination of readily available materials.

This object has been achieved by the surprising discovery that elemental sulfur, generally known as a highly flammable material, can be combined with certain flame retardant compounds possessing hazardous smoldering tendencies to produce a composition for treatment of loose-fill insulation materials to render them both flame and smolder resistant.

Accordingly, the invention provides for an improved flame and smolder resistant cellulosic insulation material comprising a cellulosic fibrous mass of sufficiently low density to provide insulating effects and treated with elemental sulfur and a flame retardant. Advantageous flame retardants include borax, aluminum sulfate, calcium sulfate, alumina trihydrate, sodium silicates, sodium phosphate, magnesium sulfate, calcium dibasic phosphate and mixtures thereof. Certain specific flame retardants of highly advantageous properties among these compounds include borax with five waters of hydration or with ten waters of hydration, aluminum sulfate with eighteen waters of hydration, sodium metasilicate pentahydrate and variations thereof, sodium mono-basic phosphate and calcium sulfate with two waters of hydration (gypsum). Some of these compounds are advantageously per se non-corrosive in nature. Others may need, within the present state-of-the-art, the addition of small amounts of buffering or corrosion-inhibiting agents to be adequately non-corrosive to metals. Additionally, it is anticipated that blending the enumerated flame retardants may be used to control acidities and obtain mixtures of retardants that are non-corrosive.

Other flame retardants may also be employed such as other alkali phosphates, mono- and di-ammonium phosphates and the like. However, some of these compounds, especially the mono- and di-ammonium phosphates can be highly corrosive to metals under some circumstances and, therefore, may not be suitable for all types of insulation materials.

The amounts of sulfur and flame retardant in the treated cellulosic fibrous mass of insulating material is of some significance. Sulfur is generally a more effective smolder retardant per weight than boric acid and thus may be required in lesser weight proportion. However, sulfur may in some cases require a somewhat higher proportion of accompanying flame retardant than with the use of boric acid. Thus, the use of sulfur in contrast to boric acid may entail a somewhat lesser or greater total weight fraction of retardants dependent upon selection of chemicals.

As low as about 10% flame retardant based on the weight of the cellulosic fibrous mass may be employed effectively. However, depending upon the particular flame retardant chosen and, the degree of flame retardancy desired, as well as the cost of the flame retardant, as much as 25% by weight of flame retardant based on the weight of cellulosic material may be employed. The amount of sulfur utilized is advantageously in the range of from about 2 to about 9% by weight, based on the weight of the cellulosic fibrous mass. Optimum quantities of sulfur may vary from 15% to more than 50% of the total amount of flame retardant utilized depending upon the characteristics of the flame retardant.

Additionally it may be advantageous in some cases to substitute some boric acid for a portion of the sulfur, retaining about the same total weight percentage of smolder retardants, for reasons or factors involving storage, handling, or milling of the chemicals, synergistic effects of the retardants, or blending of the chemicals to attain non-corrosiveness to metals.

The effects of the combination of sulfur and flame retardant are best demonstrated by realizing that the addition of from 2 to 9% by weight sulfur to the cellulosic material alone would actually increase the flame combustion tendency of the cellulosic material and, correspondingly, the addition of the aforementioned flame retardants alone to cellulosic materials, generally increases the smoldering tendency of the cellulosic material. However, the respective adverse effects are both overcome by the respective retarding actions, and the materials are found resistant to both flaming and smoldering.

The invention provides for a method of inhibiting the smolder tendency of cellulosic insulation materials, comprising treating the insulation material with elemental sulfur and with a flame retardant in the amounts indicated previously. The treating method may advantageously be conducted during the milling operation of the cellulosic materials such as when shredded newspaper or the like is run through a hammermill to produce the loose-fill insulation material in the form of a cellulosic fluff and simultaneously the powdered retardants are mixed throughout the fluff. Such addition usefully suppresses flammability hazards of the insulation in subsequent processing, handling and in accumulated leakage of the insulation in the plant. It is also advantageous to initially proportion and mix the sulfur with the flame retardant to suppress flammability hazards of the sulfur whether these chemicals are acquired as powders, or in bulk form to be ground to powder form in the plant. In the latter case, grinding of the mixture of sulfur and flame retardant would avoid flammability hazards of separate grinding of the sulfur. This consideration would also apply to the use of sulfur with boric acid and grinding of their mixture.

However, the properties of sulfur afford other options in its storage, transport, handling, and use, as it may be retained as a liquid at slightly elevated temperatures, formed into emulsions, or converted into minute encapsulated particles. It also may be rendered essentially non-flammable, if desirable, by addition of a minor fraction of certain organic additives. In this resort, the proportions of flame retardant required with the sulfur in insulation would be somewhat reduced.

The treating method may also be carried out by depositing the flame retardant and sulfur composition onto the raw cellulosic materials before milling. The treating steps may also occur after milling of the cellulosic material. However, it is recognized that the excellent flame and smolder resistant characteristics of the treated cellulosic material make it advisable that the material be treated prior to entry into all areas which may be subjected to an open flame, hotspot or some ignition flame or smoldering ignition source.

In yet another aspect of the present invention, a composition for the flame and smolder inhibiting treatment of cellulosic insulation materials is disclosed as containing a flame retardant compound and elemental sulfur in an amount of from about 15% to about 50% by weight sulfur based on the amount of flame retardant compound. Again, the particularly advantageous flame retardants include borax, aluminum sulfate, gypsum, alumina trihydrate, sodium silicates, sodium monobasic phosphate, magnesium sulfate, and calcium dibasic phosphate. This composition for imparting flame retardancy and smolder inhibition to loose-fill fibrous material may also be employed on many classes of natural and synthetic materials including cellulosic materials such as cotton, wood, paper and non-cellulosic materials including wool, polyolefins, vinyl polymers, acrylic polymers, polyesters, polyamides, epoxies and the like that may have tendencies to smolder, particularly in open-cellular form.

DESCRIPTION OF THE PREFERRED EMBODIMENTS

The most pertinent application of the present invention arises in the treatment of fiber fluff formed from used newspaper. This material is readily available and a highly efficient source of insulation material. Accordingly, in the following examples newspaper fiber fluff has been utilized exclusively, as it represents the most economical and available source of loose-fill insulation material. However, it should be noted that the following disclosure is not to limit the invention to this particular form of cellulosic insulation material.

To demonstrate the preferred embodiment of the present invention, several samples of the preferred fire retardant materials have been combined with the required amount of elemental sulfur to achieve a final insulation material having optimum fire retardancy and smolder inhibition properties without exhibiting significant corrosion problems in the insulated environment. All test samples exhibited flame retardant and smolder inhibiting characteristics sufficient to pass the proposed federal standards for insulation materials of this type which will also be described in greater detail hereinafter.

The results demonstrate that although the particular flame retardant utilized in combination with sulfur is of great significance, sulfur in amounts of from about 2 to about 9% by weight yield the necessary improved resistance to smolder combustion in the cellulosic fluff insulation material. Preferred amounts of sulfur were found to be in the 3 to 7% range.

Similarly, the amount of flame retardant necessary to provide the required safety of cellulosic fluff insulation material is within the range of about 10 to about 25% by weight, and preferably, from about 12 to about 22% by weight and, most preferably, from 12 to 18% by weight.

Description of Testing Procedures:

The relative flame resistant and smolder resistant properties of the cellulosic insulation materials were determined by the test procedures detailed in the General Services Administration Specification HH-I-515D, and similarly contained in the Consumer Product Safety Commission's Interim Safety Standard for Cellulosic Insulation. Briefly, these tests are described as follows:

Critical Radiant Flux:

The test for resistance to flame propagation uses a rectangular tray filled with specimen insulation placed in proximity to a gas-fired radiant panel such that the surface of the insulation is exposed to a radiant flux declining from 1.1 to 0.1 W/cm$^2$ along the length of the tray. After a pre-heat interval, the insulation is ignited by a pilot flame at the "hot" end of the tray. If flame spread on the insulation surface extinguishes short of the "cool" end of the tray, the flux corresponding to the furthest point of burning is noted as the "critical radiant flux," which must equal or exceed 0.12 W/cm$^2$ to pass the test criterion.

Smoldering Combustion:

The test for resistance to smoldering involves an open-top box filled with specimen insulation at an expected end-use density. A cigarette with the lit end upward is inserted vertically into the center of the insulation as an ignition source. If smoldering induced by the cigarette does not propagate throughout the box, but extinguishes with less than a 15% weight loss of the specimen, the "pass" criterion of the test is met.

EXAMPLE 1

Culminating a series of trials, batches of 10 g of commercially milled, untreated newspaper, 1.5 g of sodium tetraborate decahydrate in powder form, and 0.7 g of precipitated sulfur powder were weighed on an analytical balance to within 1 mg of the designated weights and, along with two pieces of plastic rod, were introduced into one-liter glass jars. A number of such jars, sufficient to contain material for combustion tests, were rotated on a horizontal axis by a rubber-rollered device for such purpose, for about 1 and one-half hours, such that the powdered chemicals were homogeneously distributed through the cellulosic fibrous material, but with a tumbling and mixing action sufficiently mild that the physical nature of the cellulosic fibers were unchanged. Preparation of this material and its subsequent testing were performed in an environment of 19° to 21° C. temperature and relative humidity of 40 to 50%. A portion of this material was submitted to the radiant panel test and exhibited a flame spread that extended 90.6 cm along the pan, extinguishing at the minimum radiant flux of 0.12 W/cm$^2$ recommended as the test requirement. The remaining portion of the material was subjected to the cigarette test for smolder tendency and met the test criteria, but with indications of passing by a narrow margin. The latter was confirmed by further trials, using the same percentage of borax and slightly less sulfur, which failed to meet the test criteria.

EXAMPLES 2-10

The above-described procedures were used to determine the minimum values of various combinations of flame retardant and sulfur deposited onto the cellulosic insulation material that would meet the combustion test criteria. These minimum levels are set forth in the following table:

TABLE 1

| Example No. | Flame Retardant | % Flame Retardant* | % Sulfur* |
|---|---|---|---|
| 1 | Borax ($Na_2B_4O_7.10H_2O$) | 15 | 7 |
| 2 | Borax ($Na_2B_4O_7.5H_2O$) | 12 | 7 |
| 3 | Aluminum Sulfate ($Al_2(SO_4)_3.18H_2O$) | 15 | 2.5 |
| 4 | Gypsum ($CaSO_4.2H_2O$) | 22 | 4.5 |
| 5 | Alumina trihydrate ($Al_2O_3.3H_2O$) | 22 | 3 |
| 6 | Sodium monobasic phosphate ($NaH_2PO_4.H_2O$) | 17 | 4 |
| 7 | Sodium silicate ($Na_2O$ 29.5%, $SiO_2$ 28.5%, $H_2O$ 41.8%) | 18 | 7.5 |
| 8 | Sodium silicate ($Na_2O$ 24.3%, $SiO_2$ 58.2%, $H_2O$ 17.5%) | 21 | 8 |
| 9 | Epsom salt ($MgSO_4.7H_2O$) | 21 | 3.5 |
| 10 | Calcium dibasic phosphate ($CaHPO_4.2H_2O$) | 20 | 3.5 |

*Weight % based on the amount of cellulosic material

While specific formula are given for each of the flame retardant compounds in Examples 1 through 10, other nomenclature and chemical formulae for the compounds may be utilized including:

| Example No. | |
|---|---|
| 1 | Sodium tetraborate, decahydrate |
| 2 | Sodium tetraborate, pentahydrate |
| 3 | Aluminum sulfate, hydrate |
| 4 | Calcium sulfate, dihydrate |
| 5 | Aluminum hydroxide ($Al(OH)_3$) |
| 6 | Sodium orthophosphate, diacidic monohydrate |
| 7 | Sodium metasilicate, pentahydrate ($Na_2SiO_3.5H_2O$) |
| 8 | Sodium polysilicate ($Na_2O.2.46(SiO_2.H_2O)$) |
| 9 | Magnesium sulfate |
| 10 | Dicalcium phosphate |

Optimum amounts of retardant for practical use would exceed the noted minimum values depending upon various factors including:

1. the nature of the cellulosic feedstock and whether it may contain beneficial or detrimental inorganic impurities;
2. the margin of safety that is desired in satisfying combustion test criteria; and
3. the amount of separation of retardant from fiber anticipated in normal handling before the insulation material is put into use.

It may be noted that factors 1 and 2 may involve minor adjustment of the relative portions of flame retardant and sulfur.

What is claimed is:

1. A flame and smolder resistant cellulosic insulation material comprising:
   a cellulosic fibrous mass of sufficiently low density to provide insulating effects,
   from about 2% to about 9% elemental sulfur based on the weight of the cellulosic fibrous mass, and
   from about 10% to about 25% flame retardant based on the weight of the cellulosic fibrous mass.

2. The flame and smolder resistant cellulosic insulation material of claim 1 wherein the flame retardant is selected from the group consisting of borax, aluminum sulfate, alumina trihydrate, sodium silicate, sodium monobasic phosphate, calcium sulfate, magnesium sulfate, calcium dibasic phosphate and mixtures thereof.

3. The flame and smolder resistant cellulosic insulation material of claim 2 wherein the flame retardant is borax present in an amount of about 12 to about 15% and sulfur is present in an amount of about 7% based on the weight of cellulosic material.

4. The flame and smolder resistant cellulosic insulation material of claim 3 wherein the borax is of the formula $Na_2B_4O_7 \cdot 5H_2O$ and is present in an amount of 12%.

5. The flame and smolder resistant cellulosic insulation material of claim 3 wherein the borax is of the formula $Na_2B_4O_7 \cdot 10H_2O$ and is present in an amount of 15%.

6. The flame and smolder resistant cellulosic insulation material of claim 2 wherein the flame retardant is aluminum sulfate present in an amount of about 15% and sulfur is present in an amount of about 2.5% based on the weight of cellulosic material.

7. The flame and smolder resistant cellulosic insulation material of claim 2 wherein the flame retardant is calcium sulfate in an amount of about 22% and sulfur is present in an amount of about 4.5% based on the weight of cellulosic material.

8. The flame and smolder resistant cellulosic insulation material of claim 2 wherein the flame retardant is alumina trihydrate present in an amount of about 22% and sulfur is present in an amount of about 3% based on the weight of cellulosic material.

9. The flame and smolder resistant cellulosic insulation material of claim 2 wherein the flame retardant is sodium phosphate monobasic monohydrate present in an amount of about 17% and sulfur is present in an amount of about 4% based on the weight of cellulosic material.

10. The flame and smolder resistant cellulosic insulation material of claim 2 wherein the flame retardant is sodium silicate present in an amount of about 18 to about 21% and sulfur is present in an amount of about 7.5 to about 8% based on the weight of cellulosic material.

11. The flame and smolder resistant cellulosic insulation material of claim 2 wherein the flame retardant is magnesium sulfate present in an amount of about 21% and sulfur is present in an amount of about 3.5% based on the weight of cellulosic material.

12. The flame and smolder resistant cellulosic insulation material of claim 2 wherein the flame retardant is calcium dibasic phosphate present in an amount of about 20% and sulfur is present in an amount of about 3.5% based on the weight of cellulosic material.

13. A method of inhibiting the smolder tendency of cellulosic insulating materials comprising:
treating the insulation material with elemental sulfur in an amount between about 2% and about 9% based on the weight of the insulation material, and
treating the insulation material with a flame retardant in an amount between about 10% and about 25% based on the weight of the insulation material.

14. The method of claim 13 wherein said treating steps are conducted during the milling of a cellulosic material into a condition suitable for use as insulation material.

15. The methods of claim 14 wherein the sulfur treating step and flame retardant treating step are conducted simultaneously.

16. The method of claim 13 wherein said flame retardant is selected from the group consisting of borax, aluminum sulfate, alumina trihydrate, sodium silicate, sodium phosphate, calcium sulfate, magnesium sulfate, calcium dibasic phosphate and mixtures thereof.

17. The method of claim 16 wherein the flame retardant is borax present in an amount of about 12 to about 15% and sulfur is present in an amount of about 7% based on the weight of cellulosic material.

18. The method of claim 16 wherein the borax is of the formula $Na_2B_4O_7 \cdot 5H_2O$ and is present in an amount of 12%.

19. The method of claim 16 wherein the borax is of the formula $Na_2B_4O_7 \cdot 10H_2O$ and is present in an amount of 15%.

20. The method of claim 16 wherein the flame retardant is aluminum sulfate present in an amount of about 15% and sulfur is present in an amount of about 2.5% based on the weight of cellulosic material.

21. The method of claim 16 wherein the flame retardant is calcium sulfate in an amount of about 22% and sulfur is present in an amount of about 4.5% based on the weight of cellulosic material.

22. The method of claim 16 wherein the flame retardant is alumina trihydrate present in an amount of 22% and sulfur is present in an amount of about 3% based on the weight of cellulosic material.

23. The method of claim 16 wherein the flame retardant is sodium phosphate monobasic monohydrate present in an amount of about 17% and sulfur is present in an amount of about 4% based on the weight of cellulosic material.

24. The method of claim 16 wherein the flame retardant is sodium silicate present in an amount of about 18% to about 21% and sulfur is present in an amount of about 7.5 to about 8% based on the weight of cellulosic material.

25. The method of claim 16 wherein the flame retardant is magnesium sulfate present in an amount of about 21% and sulfur is present in an amount of about 3.5% based on the weight of cellulosic material.

26. The method of claim 16 wherein the flame retardant is calcium dibasic phosphate present in an amount of about 20% and sulfur is present in an amount of about 3.5% based on the weight of cellulosic material.

27. A composition for the flame retarding and smolder inhibiting treatment of cellulosic insulation materials consisting essentially of a flame retardant compound selected from the group consisting of borax, aluminum sulfate, aluminum trihydrate, sodium silicate, sodium phosphate, calcium sulfate, magnesium sulfate, calcium dibasic phosphate and mixtures thereof and elemental sulfur in an amount of from about 15% to about 50% by weight based on the weight of the flame retardant compound.

28. The composition of claim 27 wherein the flame retardant is borax.

29. The composition of claim 27 wherein the flame retardant is aluminum sulfate.

30. The composition of claim 27 wherein the flame retardant is calcium sulfate.

31. The composition of claim 27 wherein the flame retardant is alumina trihydrate.

32. The composition of claim 27 wherein the flame retardant is sodium phosphate monobasic monohydrate.

33. The composition of claim 27 wherein the flame retardant is sodium silicate.

34. The composition of claim 27 wherein the flame retardant is magnesium sulfate.

35. The composition of claim 27 wherein the flame retardant is calcium dibasic phosphate.

* * * * *